(12) United States Patent
Hakata et al.

(10) Patent No.: US 8,912,886 B2
(45) Date of Patent: Dec. 16, 2014

(54) POWER MANAGEMENT SYSTEM FOR ELECTRONIC SHELF LABELS AND THE LIKE

(75) Inventors: Masayuki Hakata, Saitama Pref. (JP); Hidetaka Fujisawa, Saitama Pref. (JP); Masao Yamamoto, Saitama Pref. (JP)

(73) Assignees: Optoelectronics Co., Ltd. (JP); Opticon, Inc., Renton, WA (US)

( * ) Notice: Subject to any disclaimer, the term of this patent is extended or adjusted under 35 U.S.C. 154(b) by 540 days.

(21) Appl. No.: 13/003,957

(22) PCT Filed: Jul. 15, 2008

(86) PCT No.: PCT/US2008/070053
§ 371 (c)(1), (2), (4) Date: Mar. 24, 2011

(87) PCT Pub. No.: WO2010/008378
PCT Pub. Date: Jan. 21, 2010

(65) Prior Publication Data
US 2011/0175732 A1    Jul. 21, 2011

(51) Int. Cl.
G05B 19/00 (2006.01)
G05B 23/00 (2006.01)
G06F 7/00 (2006.01)
G06Q 30/06 (2012.01)

(52) U.S. Cl.
CPC ..................................... *G06Q 30/06* (2013.01)
USPC ................... 340/5.91; 340/10.31; 340/10.32; 340/10.33; 340/539.1; 345/211

(58) Field of Classification Search
CPC ........... G09G 2380/04; G09G 2370/16; G06F 1/3265

USPC ................... 340/5.91, 10.31, 10.33; 709/204; 705/1.1
See application file for complete search history.

(56) References Cited

U.S. PATENT DOCUMENTS

| | | | | |
|---|---|---|---|---|
| 4,799,059 A | * | 1/1989 | Grindahl et al. | 340/870.03 |
| 5,198,644 A | * | 3/1993 | Pfeiffer et al. | 235/383 |
| 5,640,151 A | * | 6/1997 | Reis et al. | 340/10.2 |
| 5,704,049 A | * | 12/1997 | Briechle | 715/744 |
| 5,850,416 A | * | 12/1998 | Myer | 375/221 |

(Continued)

FOREIGN PATENT DOCUMENTS

| | | |
|---|---|---|
| CN | 1690955 A | 11/2005 |
| CN | 1938713 A | 3/2007 |

OTHER PUBLICATIONS

International Search Report and Written Opinion, dated Oct. 14, 2008 of International Application No. PCT/US08/70053, filed: Jul. 15, 2008.

(Continued)

*Primary Examiner* — Daniel Wu
*Assistant Examiner* — Son M Tang
(74) *Attorney, Agent, or Firm* — Kaplan Breyer Schwarz & Ottesen, LLP

(57) ABSTRACT

A power management system is disclosed in which ESL labels communicate with a server through a base station. The frequency and times at which each ESL label communicates with the server is optimized for the minimum communication necessary to provide up to date pricing and related information, and to simultaneously minimize consumed battery power for the ESL labels. The base stations and servers for the system are preferably operated from hard wired power.

16 Claims, 2 Drawing Sheets

(56) References Cited

U.S. PATENT DOCUMENTS

| | | | |
|---|---|---|---|
| 6,269,342 B1* | 7/2001 | Brick et al. | 705/20 |
| 6,318,631 B1* | 11/2001 | Halperin | 235/383 |
| 6,329,944 B1* | 12/2001 | Richardson et al. | 342/42 |
| 6,473,607 B1 | 10/2002 | Shohara et al. | |
| 6,535,119 B1* | 3/2003 | Haulk et al. | 340/502 |
| 6,622,410 B2* | 9/2003 | Wilkes et al. | 40/654 |
| 6,650,230 B1 | 11/2003 | Evans et al. | |
| 6,804,578 B1* | 10/2004 | Ghaffari | 700/229 |
| 6,879,246 B2* | 4/2005 | Wuidart | 340/10.2 |
| 7,021,535 B2* | 4/2006 | Overhultz et al. | 235/382 |
| 7,026,913 B2* | 4/2006 | Bhyravabhotla | 340/5.91 |
| 7,203,657 B1* | 4/2007 | Noam | 705/26.1 |
| 7,287,001 B1* | 10/2007 | Falls et al. | 705/22 |
| 7,504,952 B2* | 3/2009 | Kaplan et al. | 340/572.7 |
| 7,520,429 B2* | 4/2009 | Koster | 235/383 |
| 7,676,251 B2* | 3/2010 | Sugie et al. | 455/574 |
| 7,830,262 B1* | 11/2010 | Diorio et al. | 340/572.4 |
| 7,852,216 B2* | 12/2010 | Roesner | 340/572.1 |
| 7,933,804 B2* | 4/2011 | Bhyravabhotla | 705/20 |
| 8,248,239 B2* | 8/2012 | Butler et al. | 340/572.1 |
| 2001/0028300 A1 | 10/2001 | Matsushita | |
| 2002/0002421 A1 | 1/2002 | Murofushi | |
| 2002/0065726 A1* | 5/2002 | Bhyravabhotla | 705/20 |
| 2003/0132833 A1 | 7/2003 | Haulk et al. | |
| 2003/0133468 A1 | 7/2003 | Haulk et al. | |
| 2003/0135416 A1 | 7/2003 | Haulk et al. | |
| 2004/0233041 A1* | 11/2004 | Bohman et al. | 340/10.1 |
| 2005/0108098 A1* | 5/2005 | Syed et al. | 705/16 |
| 2005/0156031 A1 | 7/2005 | Goel et al. | |
| 2005/0281320 A1* | 12/2005 | Neugebauer | 375/141 |
| 2006/0091999 A1* | 5/2006 | Howarth | 340/10.3 |
| 2006/0114104 A1* | 6/2006 | Scaramozzino | 340/10.2 |
| 2006/0163349 A1 | 7/2006 | Neugebauer | |
| 2007/0013481 A1* | 1/2007 | Zhu et al. | 340/10.1 |
| 2007/0075838 A1* | 4/2007 | Powell | 340/10.2 |
| 2007/0181678 A1* | 8/2007 | Nilsson et al. | 235/383 |
| 2007/0279228 A1* | 12/2007 | Morris et al. | 340/572.1 |
| 2009/0051533 A1* | 2/2009 | Roesner | 340/572.1 |
| 2009/0307617 A1* | 12/2009 | Howe et al. | 715/764 |
| 2011/0084951 A1* | 4/2011 | Karhuketo et al. | 345/211 |
| 2012/0120471 A1* | 5/2012 | Hamalainen et al. | 359/238 |

OTHER PUBLICATIONS

"Related Chinese Application No. 200880130391.1 Office Action", Mar. 13, 2013, Publisher: CIPO, Published in: CN.

Michael Moltenbrey, "Related EP Patent Application No. 08817410.7 Extended Search Report", Apr. 5, 2013, Publisher: EPO, Published in: EP.

"Related Chinese Patent Application No. CN 2008 801303911 Office Action", Jan. 13, 2014, Publisher: CIPO, Published in: CN.

* cited by examiner

POWER MANAGEMENT SYSTEM FOR ELECTRONIC SHELF LABELS AND THE LIKE

The present patent application is the U.S. national stage of International Application No. PCT/US08/070,053, which was published in English on Jan. 21, 2010 under Publication No. WO 2010/008378 A1. The disclosure of the International Application is hereby incorporated by reference in its entirety.

DISCLOSURE OF INVENTION

This invention relates to power management systems, and specifically, to power management systems for use in electronic shelf labels (ESL) and the like.

ESL systems are beginning to gain acceptance in retail and similar environments. ESL systems are intended to replace conventional price labeling systems with electronic LED and/or LCD displays in which the price of an item is displayed for viewing by a consumer. An advantage of such ESL systems is that pricing of hundreds or thousands of items throughout a retail environment can be managed by a server centrally rather than having paper price labels replaced or updated all over the retail environment every time a price changes. Additionally, other messages in addition to pricing data can be set by a central operator and displayed to a consumer.

Through the use of ESL systems, a management server can communicate electronically with an ESL label and update the data displayed on that label, including, but not limited to, the price. By permitting a central server and database system to perform all of the price and data maintenance and update functions for the ESL labels, a much more centrally controlled and consistent environment is created, when compared with prior conventional systems that require retail store clerks to visit the shelf and change paper labels.

One major issue with ESL systems relates to providing convenient long term power management to the ESL labels. First, the ESL labels themselves should preferably run on batteries, not hardwired power. This is because it is not optimum to be running power supply wires to all of the various ESL labels on the retail shelves. Additionally, even if such power wires could be run, when products are moved and/or reorganized such that the shelf space is apportioned differently, the ESL labels, and hence the power wiring, would have to be moved as well.

Retail store operators therefore wish to run ESL labels on battery power. However, because of the communications that takes place between the ESL labels and/or the base station and servers, battery power is depleted relatively rapidly, and the ESL labels require battery replacement. Each time the server communicates with the ESL labels, battery power is drained for the ESL label to communicate back an acknowledgement or similar message.

The foregoing is a significant drawback, because a retail environment selling thousands or tens of thousands of items will constantly have batteries all over the store that need to be replaced. In view of the foregoing, there exists a need in the art for a more optimized ESL power management system that avoids replacement of batteries so frequently.

BEST MODE OF CARRYING OUT INVENTION

Figure 1:
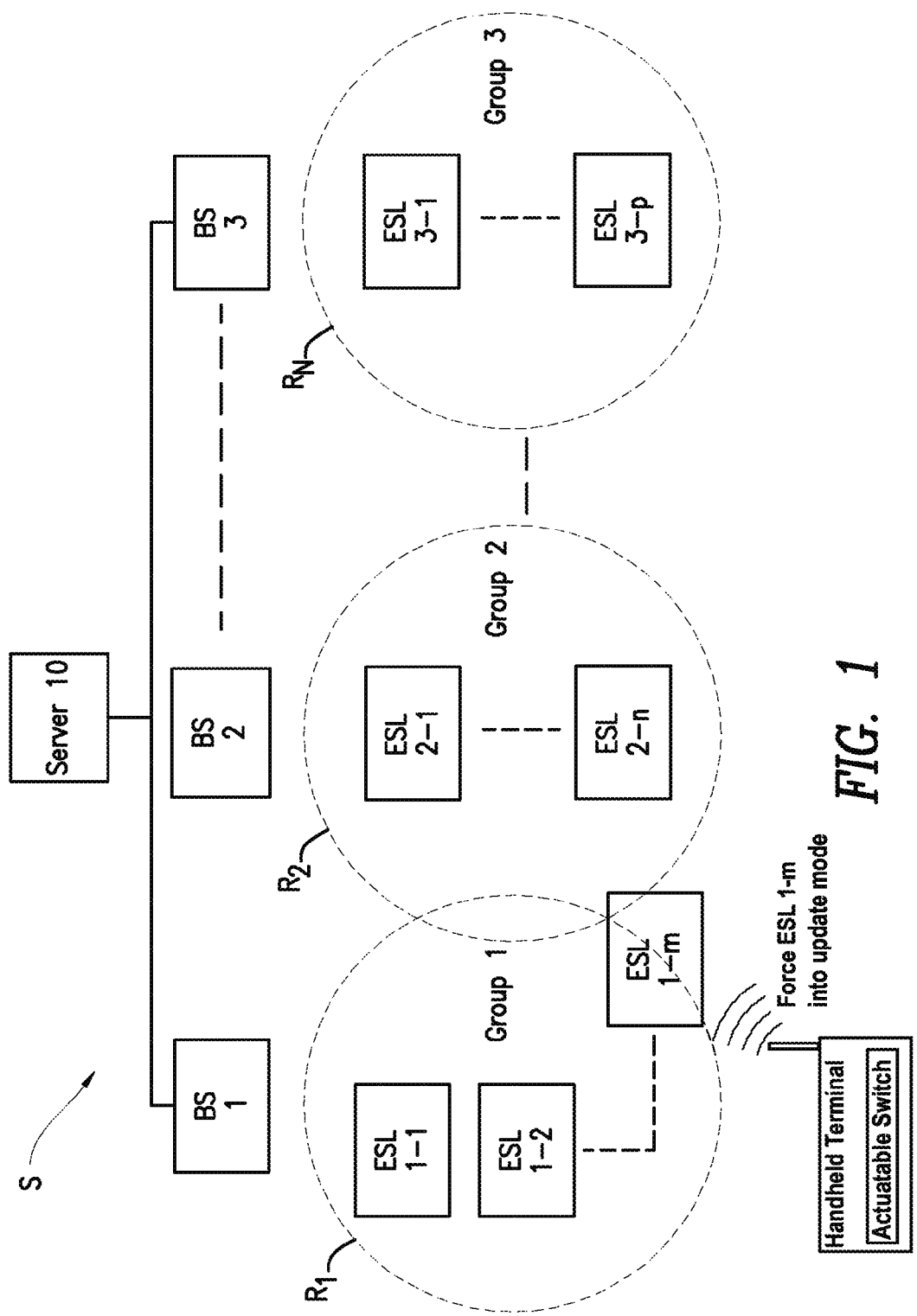
FIG. 1 depicts a conceptual diagram of the basic components of an ESL system in a retail environment.

FIG. 1 depicts, in block diagram form, the various components of an ESL label system. The arrangement of FIG. 1 includes numerous ESL labels that are shown as organized into groups R1-R3, several base stations numbered 1-3, and a central server 10. It is understood that the grouping of the various ESL labels and the plurality of base stations are for exemplary purposes only.

In operation, the data to be displayed on the ESL system, such as item name, pricing information, etc., is stored at the server 10, such data may be input by automatic or manual means, and may require approval of an operator prior to being distributed to the ESL labels. The pricing data may also originate from a remote computer source, such as an external database or the like.

Base stations 1-3 communicate with associated groups of ESL labels R1-R3. The hierarchy of base stations and ESL labels is not critical to the present invention, however, plural base stations are preferably used because the physical locations of the various ESL labels throughout a retail environment may make it difficult for a single base station to communicate effectively with all ESL labels.

In accordance with an embodiment of the present invention, the communications required between the ESL labels and the base station and server is minimized to only take place when information from the server 10 to the ESL labels will likely be required to be transmitted. Specifically, each of ESL labels R1-R3 is initially installed as preprogrammed to communicate with its associated base station, and thus, server 10, at a specified set of times or frequencies. For example, an ESL label may be programmed to communicate with server 10 through its base station once per day. The times and frequencies with which any ESL label communicates with a base station may be the same or different from other ESL labels using the same base station or different base stations.

Alternatively, an ESL label may be programmed to communicate with server 10 through its base station twice during the day at specific times, but at no time during the night. Any combination of specific times and/or time between subsequent communications may be programmed into the ESL labels when initially installed. Preferably, such programming is done with a view towards attempting to communicate with the server at times when price and/or other data may need to be updated, but no more frequently than such updates would be required. Communicating too frequently with the server 10 through the base stations will result in excessive and unnecessary power loss and battery drainage. However, communicating too infrequently will result in outdated prices and/or other data being displayed on the ESL label.

When a particular ESL timer indicates that communication with server 10 is required, the ESL label "wakes up" and sends a very short and low power consumption signal to server 10, identifying such ESL label. Server 10 then transmits to the appropriate ESL label a message indicating a specific future time, and a specific communications channel on which the required data to be updated will be sent. The specific communications channel is required because each base station and/or ESL label may be capable of communicating on more than one channel, or the ESL labels may communicate on different channels from each other. Alternatively, if there is no data to update, then the server simply transmits a signal back to the ESL label confirming same, or alternatively, may simply do nothing.

The server 10 keeps track of how often pricing and/or other data updates are required relative to how often communications with each particular ESL label are requested. The server therefore has software that can recognize if price updates, for example, are not occurring as often as the ESL label is contacting the server. Or, put another way, if a particular ESL label is contacting the server more often than it needs to, then the server can identify this. In response to such identification, the server can transmit information to the ESL label that updates the frequency and/or time at which the ESL label contacts the server in order to obtain any updates to information stored in the particular ESL. Thus, if the server determines that the ESL label is contacting the server 4 times per day, but that on average, the pricing or other data is only being updated 25% of the time (i.e.; once per day), then the server can alter the information in the ESL so the ESL only contacts the server thereafter once per day, or perhaps twice per day.

In another embodiment, the server, when identifying that a particular ESL label is contacting the server too frequently can simply display the visual and/or audible warning message to an operator, thereby permitting the operator to update the frequency at which such communications takes place. Note that both the foregoing can also be used to decrease the frequency at which the ESL label and server communicate for updates.

In an alternative embodiment, the ESL labels need not first contact the server at the relevant time. Instead, each ESL label is programmed with specific times that server contact will take place. The server itself maintains a database storing all of the contact times for all of the ESL labels. At the appropriate time, the ESL label "wakes up" and the server contacts the ESL label at that time. This methodology may be less preferred over the former methodology, because it would require that the clocks within each ESL label and that within the server be synchronized to a very high degree of exactness. Also, if the times or frequencies change, the server would have to transmit to the ESL label information that tells the ESL label when it should wake up in accordance with the new schedule.

In addition to the times at which the server 10 and ESL labels will communicate, the specific communication channel on which such communications is to take place may also be specified or agreed upon in advance. Specifically, when the ESL label contacts the server 10 for communication, server 10 could, in direct response and on the same communication channel, advise the particular ESL label that pricing and other data will be updated at a specific time in the future, and on a specific communications channel. This would allow a base station to communicate with multiple different ESLs in the same group at the same time, by multiplexing such communications across different frequencies or other channels.

Figure 2:
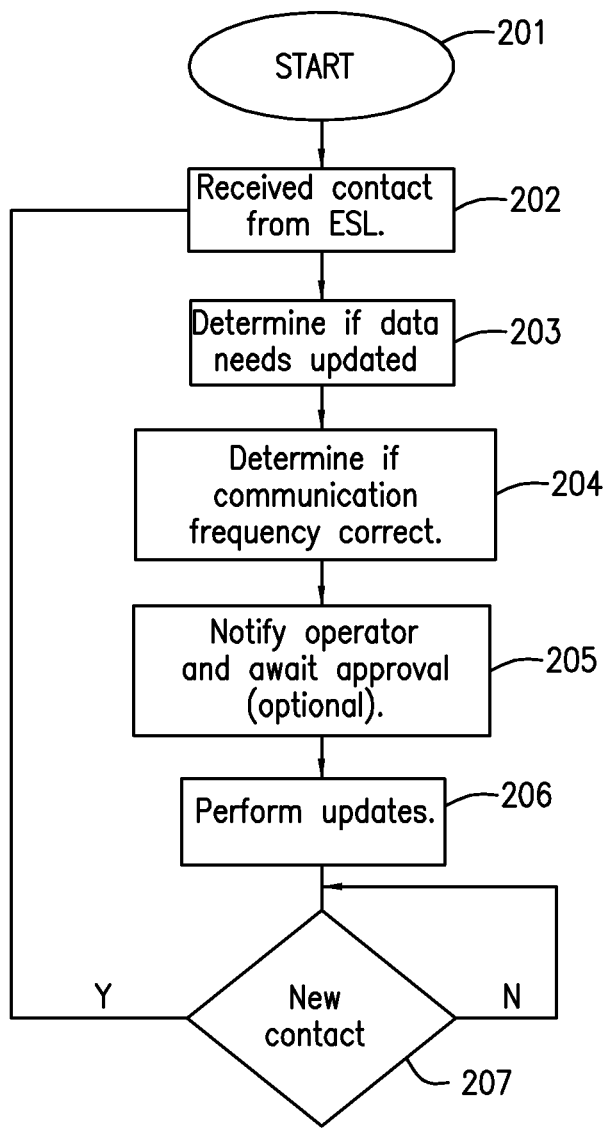
FIG. 2 depicts a flowchart of an exemplary methodology in accordance with the present invention.

FIG. 2 depicts an exemplary flowchart of the present invention. In the arrangement of FIG. 2, after the methodology starts at block 201, the server 10 receives a contact from one of the ESLs through one of base stations 1-3. The server 10 initially makes a determination if the data in the ESL (e.g., price) needs to be updated. Next, at block 204, a determination is made as to whether the frequency and/or timing of the communication needs to be altered. At block 205, is the optional step of notifying the operator and possibly requiring approval of such operator prior to performing updates.

At block 206, the updates are performed and the ESL data is transmitted to the particular ESL tag. The control is then transferred to decision point 207, where the server waits for a new contact from the same or a different ESL label. In a preferred embodiment, both the server and any base stations run on hard wired electric power, so that power management is not a problem. Due to the system of warnings and optional automatic adjustments made by server 10, the system tends towards providing communication between each ESL label and server 10 often enough to insure that pricing and other data is not too old, however, such communications are not too often so as to deplete battery power. Also, because the communications and price updates for each ESL or group of ESL's is maintained, the system can customize the communications so that ESL labels that require more frequent updates will communicate more frequently with the server 10 through their associated base stations.

In one embodiment, for example, the server identifies that ESL label No. 1.2 has contacted the server and facilitated communication, over the passed ten days, ten times, because ESL label contacts the server once per day. However, it is determined that the price or other data in the ESL label has only changed twice. Under such circumstances, the server might either notify the operator or automatically change the situation so that ESL label 1.2 communicates with server 10 only once every five days. Preferably, an adjustment is made to permit communications slightly more frequently than the frequency at which the ESL label is shown historically to be updated. Thus, the system could automatically adjust communications to occur ten percent more often than the maximum frequency at which price or other data than the ESL label is shown historically to be updated. In another embodiment, the adjustment can be made to insure that communication takes place exactly as often as price or other data has been updated, however, this latter embodiment is preferably only implemented when there is a long history of communications, so that the operator can be reasonably sure that the ESL label at issue will not require communications more often.

In another embodiment, the system permits exception, or "ad hoc" updating as needed. Specifically, it is possible that a store clerk or manager may wish to have one or more ESL's updated at some other time, which time is not part of the normal schedule for the particular ESL label. This can be accomplished in one of several manners. A first manner is that a handheld terminal is used to send a signal to an ESL label and cause the ESL label to go query the server system. This can be accomplished by either the handheld terminal sending a signal to the ESL label on a separate frequency or other channel, or it can alternatively be accomplished by an activatable switch on the ESL label itself that overrides the normal schedule for communication with the server, and causes the system to immediately communicate with the server for a price update. It can also be accomplished by plugging in a wire from the handheld terminal to the ESL label, and then entering commands into the handheld terminal that get conveyed to the ESL label.

In another ad hoc methodology, the hand held device can communicate directly to the server and cause the server to provide an immediate update of pricing or scheduling information to the ESL label. In order to ensure the ESL label can receive such an update, the ESL label must either be activated by the hand held to be able to receive a signal from the server, or must be kept in a mode that it will be able receive data from the server at any time.

While the foregoing describes the preferred embodiment of the invention, various other modifications and additions will be apparent to those of skill in the art. In one such modification, it is possible to apply the techniques described herein to areas other than simply ESL label systems. For example, any host that manages and/or communicates with a variety of clients or other type of computer systems may similarly take advantage of the techniques of the present invention.

Such modifications or additions are intended to be covered by the claims appended hereto.

The invention claimed is:

1. A method comprising:
distributing a plurality of Electronic Service Label (ESL) tags throughout a selling environment, wherein the plurality of ESL tags comprises a first ESL tag and a second ESL tag that are assigned different rates at which to contact a server;
initiating contact with the server by the first ESL tag;
determining, by the server, whether said assigned rate should be changed for the first ESL tag contacting said server, wherein the determination is based at least in part on:
   (i) monitoring, by the server, over a period of time:
      (a) a first frequency at which the first ESL tag contacts said server, and
      (b) a second frequency at which ESL data associated with the first ESL tag is updated, and
   (ii) determining, by the server, if said second frequency is less than a Prescribed percentage of said first frequency;
causing, by the server, said first frequency to be changed when said second frequency is determined to be less than the prescribed percentage of said first frequency; and
changing the assigned rate associated with the first ESL tag by transmitting a message to the first ESL tag based on the determination.

2. The method of claim 1 wherein said changing includes transmitting a command signal from the server through a base station to the first ESL tag.

3. The method of claim 2 wherein said changing also includes changing pricing data associated with the first ESL tag.

4. The method of claim 1 wherein said causing includes generating an alert message for display to an operator, thereby permitting said operator to select a new first frequency.

5. The method of claim 1 wherein said causing includes automatically decreasing said first frequency to a value of said second frequency.

6. A method comprising:
deploying plural Electronic Service Label (ESL) tags throughout a selling environment, wherein said plural ESL tags comprises a first ESL tag and a second ESL tag;
providing a stored schedule of when said first ESL tag should initiate contact with a server;
upon the first ESL tag contacting the server, reprogramming the first ESL tag by changing said schedule, wherein reprogramming the first ESL tag is based at least in part on:
   (i) monitoring, by the server, over a period of time:
      (a) a first frequency at which the first ESL tag contacts said server, and
      (b) a second frequency at which ESL data associated with the first ESL tag is updated;
   (ii) determining, by the server, if said second frequency is less than a Prescribed percentage of said first frequency; and
   (iii) in response to the determination, changing the stored schedule in such a way that the first ESL tag contacts the server as infrequently as possible without permitting the first ESL tag to contain outdated information.

7. The method of claim 6 wherein said schedule is not periodic.

8. The method of claim 6 further comprising:
responsive to a determination that said schedule is to be changed for the first ESL tag, determining that the schedule of the second ESL tag should also be changed, and
storing change information in said server so that when the second ESL tag contacts said server, said information stored in said server changes the schedule of the second ESL tag.

9. A method comprising:
deploying a plurality of Electronic Service Label (ESL) tags throughout a selling environment, each ESL label being programmed to initiate communication with a server on a predetermined schedule,
storing the schedule of the ESL tags in storage accessible to the server,
communicating with the ESL tags in accordance with the schedule,
determining whether said schedule requires communicating too often for at least one ESL tag, wherein the determination is based at least in part upon whether pricing update information is to be sent to said at least one ESL tag less than a prescribed percentage of times said at least one ESL tag communicates with said server, and
if so, altering said schedule stored in said at least one ESL tag.

10. The method of claim 9 wherein said schedule is different for different ESL tags.

11. The method of claim 9 wherein said schedule includes both a time and a selected one of plural communications channels.

12. A method of facilitating communications between a transmitting station and a plurality of Electronic Service Label (ESL) labels, said method comprising:
a first ESL label entering an update mode at predetermined times, the update mode being one in which said first ESL label initiates communication with a host computer to receive:
   (i) first updated data, wherein the first updated data comprises price information, and
   (ii) second updated data that alters said predetermined times, if such second updated data is available from said host, wherein said second updated data is based at least in part on:
      (a) monitoring, over a period of time, a first frequency at which the first ESL label contacts said host computer, and a second frequency at which ESL data associated with the first ESL label is updated, and
      (b) determining if said second frequency is less than a prescribed percentage of said first frequency; and
a actuatable switch that permits an operator to force said first ESL label into said update mode at a desired time.

13. The method of claim 12 wherein said actuatable switch is connected to a handheld terminal and communicates in a wireless manner with the first ESL label.

14. The method of claim 12 wherein said actuatable switch is connected to a handheld terminal and communicates in a hard wired manner with the first ESL label.

15. The method of claim 12 wherein the actuatable switch is connected directly to the first ESL label.

16. A method comprising:
deploying a plurality of Electronic Service Label (ESL) tags throughout a selling environment, each ESL label being programmed to initiate communication with a server on a predetermined schedule;
storing the schedule of the ESL tags in storage accessible to the server;

communicating with the ESL tags in accordance with the schedule;

determining whether said schedule requires communicating too often for at least one ESL tag, wherein the determination is based at least in part upon whether pricing update information is to be sent to said at least one ESL tag less than a prescribed percentage of times said at least one ESL tag communicates with said server;

if so, altering said schedule stored in said at least one ESL tag; and communicating, from a hand held terminal to said server, information to cause said server to update the at least one ESL tag at a time other than that in accordance with the assigned rate.

* * * * *